April 12, 1932.   W. G. HUMPHREYS ET AL   1,853,306
CHAIN CONNECTER FOR PULLEYS
Original Filed Sept. 5, 1928
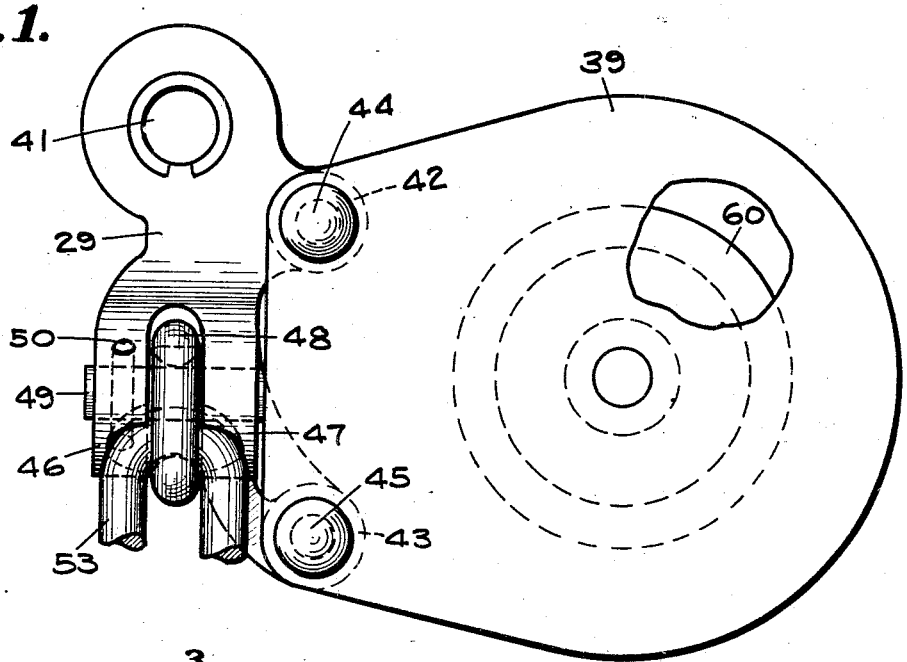
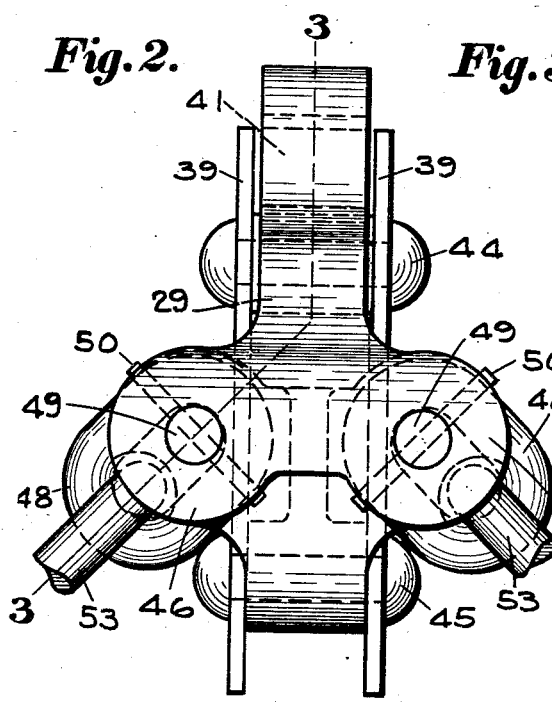
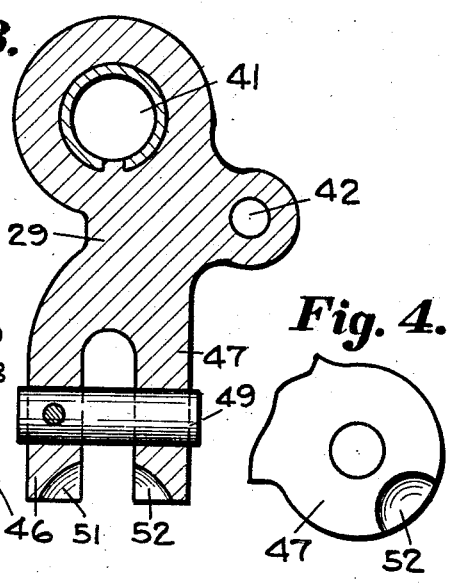
Inventors
W. G. Humphreys
O. R. Humphreys
By Arthur H. Sturges
Attorney Patented Apr. 12, 1932

1,853,306

UNITED STATES PATENT OFFICE

WALTER G. HUMPHREYS AND OMAR R. HUMPHREYS, OF OMAHA, NEBRASKA

CHAIN CONNECTER FOR PULLEYS

Original application filed September 5, 1928, Serial No. 304,128. Divided and this application filed July 15, 1929. Serial No. 378,291.

The present invention relates to improvements in chain connecters and is a division of our prior application entitled "Drag-line excavating bucket," Serial No. 304,128, filed September 5, 1928.

An object of the invention is to provide an improved chain connecter for pulleys or particularly applicable to a drag-line bucket in which the improved connecter provides for the convenient attachment of the bail chain of the bucket, and affords means for attaching the cable thereto.

Another object of the invention is to provide an improved chain connecter for pulleys whereby stock-size chain may be attached to the dump line sheave or pulley without undue labor.

A further object of the invention resides in providing an improved chain connecter for pulleys in which the chain intimately cooperates with the structure of the connecter whereby the two are united in a strong relation and whereby the chain is resisted from turning.

A still further object of the invention is to provide an improved chain connecter and combined pulley structure whereby in a small, compact and inexpensive structure the bail chain and the cable may be united.

With the foregoing and other objects in view, the invention will be more fully described hereinafter, and will be more particularly pointed out in the claim appended hereto.

In the drawings wherein like symbols refer to like or corresponding parts throughout the several views.

Figure 1 is a side elevation of an improved chain connecter for pulleys, as constructed in accordance with the present invention, parts being broken away.

Figure 2 is an end elevation of the same.

Figure 3 is a cross section taken on the line 3—3 in Figure 2, and

Figure 4 is a fragmentary view showing in detail one of the arms with a recess.

Referring more particularly to the drawings, the sheave connecter 29 is shown as having an eye 41 at its upper end to receive a hook. Other laterally extending eyes 42 and 43 are carried by the connecter member for the purpose of fitting within the plates of the sheave to receive the pins 44 and 45 by which the sheave is secured to the connecter member 29.

The lower part of this connecter member 29 is provided with downwardly divergent portions each of which is bifurcated and formed with the parallel spaced arms 46 and 47 to each receive therebetween the upper link 48 of one of the bail chains.

The arms 46 and 47 are perforated to receive the pin 49 which passes also through the link 48 and serves to hold the chain in the connecter member. A cross locking pin 50 extends through one of the arms 46 and through the pin 49. The free exposed ends of the arms 46 and 47 are provided with the recesses or cut away portions 51 and 52. These cut away portions are rounded and shaped to conform to the ends of the links 53 of the bail chains which are coupled with the end links 48. The sides of the recesses 51 and 52 will engage the side portions of the links 53 and avoid turning movement of the links or twisting strain exerted upon the end links 48. The side plates of the pulley or sheave are indicated at 39 and they are attached to the eyes 42 and 43 by the rivets or other fastening means 44 and 45.

In Figure 1 one of the side plates 39 is broken away to show the sheave drum 60 which is held between the plates 39 and which receives a cable.

It will be noted from Figure 3 that the recesses 51 and 52 are made upon mutually opposite inner faces of the links or arms 46 and 47 and that such recesses open inwardly upon the inner faces of the arms and also downwardly through the lower ends of the arms. It will be apparent from a comparison of Figures 3 and 4 that the recesses 51 and 52 are sections of a sphere and that they agree with the end curvature given to the chain links 53 whereby to snugly receive such ends of the chain links and to form pockets for holding the links in place and against twisting and side movements. From Figure 2 it will be apparent that the links 53 are sustained in a diagonal position by reason of the contact of such links with the walls of the recess 51 and 52, and this action of the recesses will supplement that of a spreader bar. It is apparent also that the arrangement of the recesses 51 and 52 permits of the end link 48 being received to a greater extent between the arms 46 and 47 of the connecter, and the connecter supports not only the end link 48 but also the next adjacent link 53 and much strain is taken off the pin 49 by the recess arrangement.

We do not wish to be restricted to the size, form and proportions of the various parts, and obviously changes could be made in the construction herein described without departing from the spirit of the invention, it being only necessary that such changes fall within the scope of the following claim.

We claim:

A chain connecter for pulleys, comprising a body member, supporting means carried by the body member and having two spaced apart pairs of bifurcated arms, the arms of each pair having curved recessed walls facing each other to receive the adjacent links of a bail chain.

In testimony whereof we affix or signatures.

WALTER G. HUMPHREYS.
OMAR R. HUMPHREYS.